| United States Patent [19] | [11] Patent Number: 5,251,369 |
| August, Jr. et al. | [45] Date of Patent: Oct. 12, 1993 |

[54] ALIGNMENT ASSEMBLY JIG FOR A MODULAR FACE-PUMPED LASER

[75] Inventors: John L. August, Jr., Schenectady; Mark J. Kukla, Ballston Spa, both of N.Y.

[73] Assignee: General Electric Company, Schenectady, N.Y.

[21] Appl. No.: 952,081

[22] Filed: Sep. 28, 1992

[51] Int. Cl.$^5$ .............................................. B25B 27/14
[52] U.S. Cl. ................................... 29/281.5; 269/296
[58] Field of Search ................... 269/296, 903, 40, 41, 269/43, 37, 265; 29/281.1, 281.5, 464, 466

[56] References Cited

U.S. PATENT DOCUMENTS

| 4,206,911 | 6/1980 | Harrison | 269/296 |
| 4,691,905 | 9/1987 | Tamura et al. | 269/296 |

Primary Examiner—Robert C. Watson
Attorney, Agent, or Firm—James R. McDaniel; Paul R. Webb, II

[57] ABSTRACT

This invention relates to an alignment assembly jig for face-pumped slab laser heads of the type that are constructed of individual components, which are rigidly attached together, in order to form an integral jig structure. Such structures of this type, generally, allow the face-pumped slab laser head components to be assembled and disassembled easily and quickly.

3 Claims, 3 Drawing Sheets

ALIGNMENT ASSEMBLY JIG FOR A MODULAR FACE-PUMPED LASER

BACKGROUND OF THE INVENTION

1. Field of the Invention

This invention relates to an alignment assembly jig for face-pumped slab laser heads of the type that are constructed of individual components, which are rigidly attached together, in order to form an integral jig structure. Such structures of this type, generally, allow the face-pumped slab laser head components to be assembled and disassembled easily and quickly.

2. Description of the Related Art

Up to the present invention, complete dismantling of a face-pumped slab laser head is required in order to repair, replace or service a face-pumped laser. The complete dismantling typically requires a total optical alignment to properly restore the laser performance. A typical "down time" for a face-pumped slab laser which usually involves complete dismantling, re-assembly and realignment is about two days. Obviously, such a lengthy "down time" is expensive and time consuming. Therefore, a new advantageous system, therefore, would be presented if such amounts of "down time" could be reduced.

It is known, in commercial rod lasers, to utilize a rod, an end cap, and a flow tube replacement assembly to reduce "down time". While this replacement assembly performs adequately for a rod laser, a face-pumped slab laser requires a far more complex replacement or modular assembly, such as, for example, the cooling integration and cooling passage design. Also, the optical alignment requirements of a rod laser are not as stringent as those of a face-pumped slab laser. Therefore, modular slab laser assembly which reduced "down time" would be advantageous.

It is apparent from the above that there exists a need in the art for a laser system which has a modular construction to reduce "down time", and which at least equals the safety and performance characteristics of other known lasers, but which at the same time is capable of being used with a face-pumped slab laser. It is a purpose of this invention to fulfill this and other needs in the art in a manner more apparent to the skilled artisan once given the following disclosure.

SUMMARY OF THE INVENTION

Generally speaking, this invention fulfills these needs by providing an alignment jig assembly for a modular face-pumped laser head, comprising a bottom plate means, first and second end plate means operatively connected to said bottom plate means, an alignment means operatively connected to said end plate means, and a support means operatively connected to said bottom plate means and said end plate means.

In certain preferred embodiments, the bottom plate means, end plate means and support means are constructed of aluminium. Also, the alignment means includes alignment blocks, slots, and a fastener.

In another further preferred embodiments, the alignment jig assembly allows the modular face-pumped laser head to be quickly and easily assembled and, if necessary, disassembled.

The preferred alignment jig assembly for a modular face-pumped slab laser head, according to this invention, offers the following advantages: easy assembly and repair of the laser system; good stability; good durability; easy slab and optical alignment; good economy; and high strength for safety. In fact, in many of the preferred embodiments, these factors of assembly and repair, and slab and optical alignment are optimized to an extent that is considerably higher than heretofore achieved in prior, known laser heads.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several veins and in which.

DETAILED DESCRIPTION OF THE INVENTION

Figure 1:
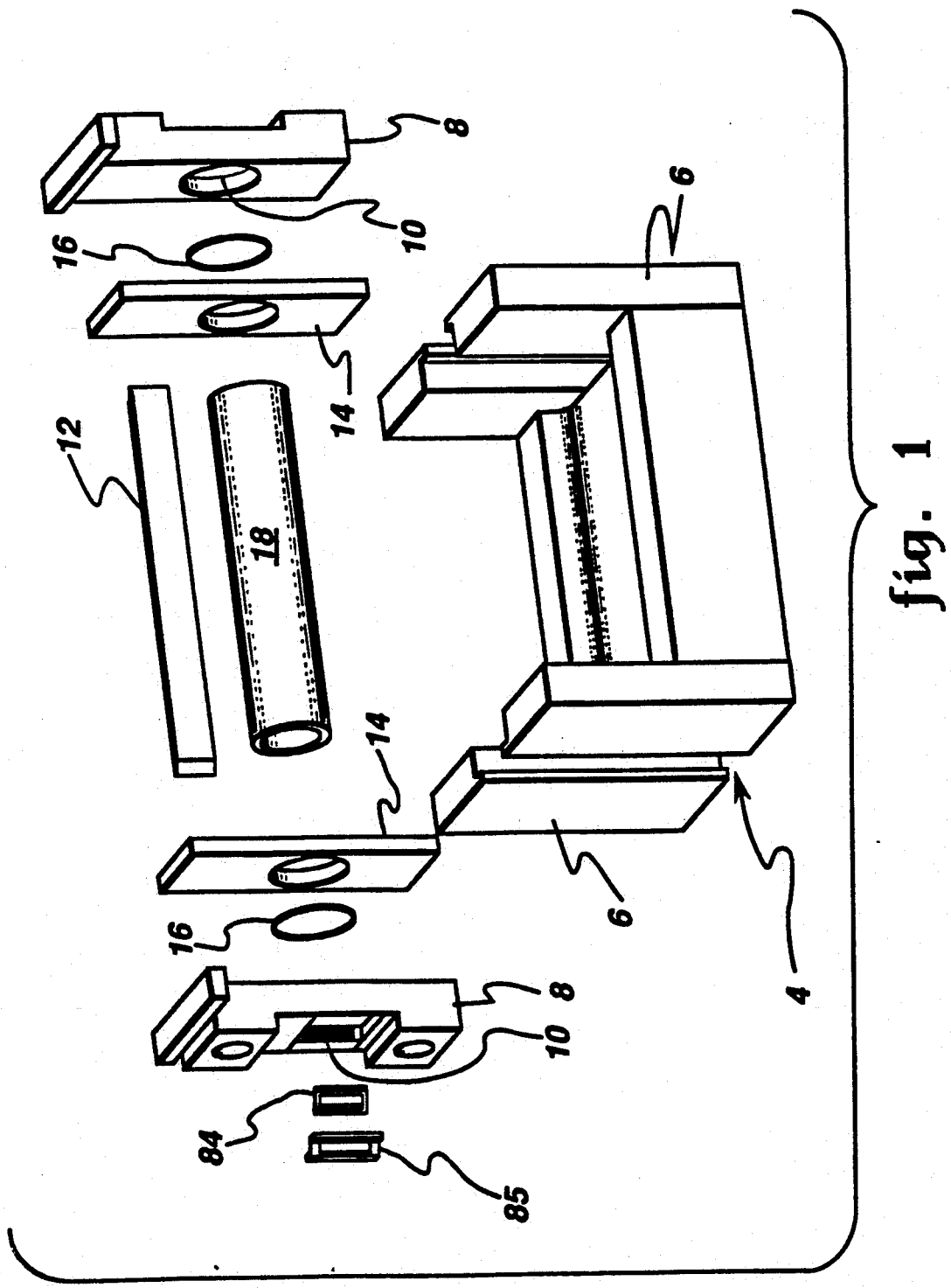
FIG. 1 is an exploded view of the component parts of a modular face-pumped slab laser, according to the present invention.

With reference first to FIG. 1, there is illustrated some of the component parts of modular face-pumped slab laser head 2. Head 2 includes, in part, lower reflector half 4, guide posts 6, outer end cap 8 having slab alignment slot 10, slab 12, inner end cap 14, gaskets 16, slab tube 18, slab seal gasket 84 and slab seal retainer 85. Reflector half 4 and guide posts 6, preferably, are constructed of aluminum which are then coated by conventional coating techniques with gold. End caps 8, preferably, are constructed of brass which are then coated by conventional coating techniques with gold. Slab 12, preferably, is constructed of any suitable solid state lasing material such as Nd:YAG. Inner end cap 14, preferably, is constructed of copper which are then coated by conventional coating techniques with gold. Gaskets 16, preferably, are constructed of any suitable elastomeric material. Slab tube 18, preferably, is constructed of any suitable heat-resistant transparent material, such as glass.

Figure 2:
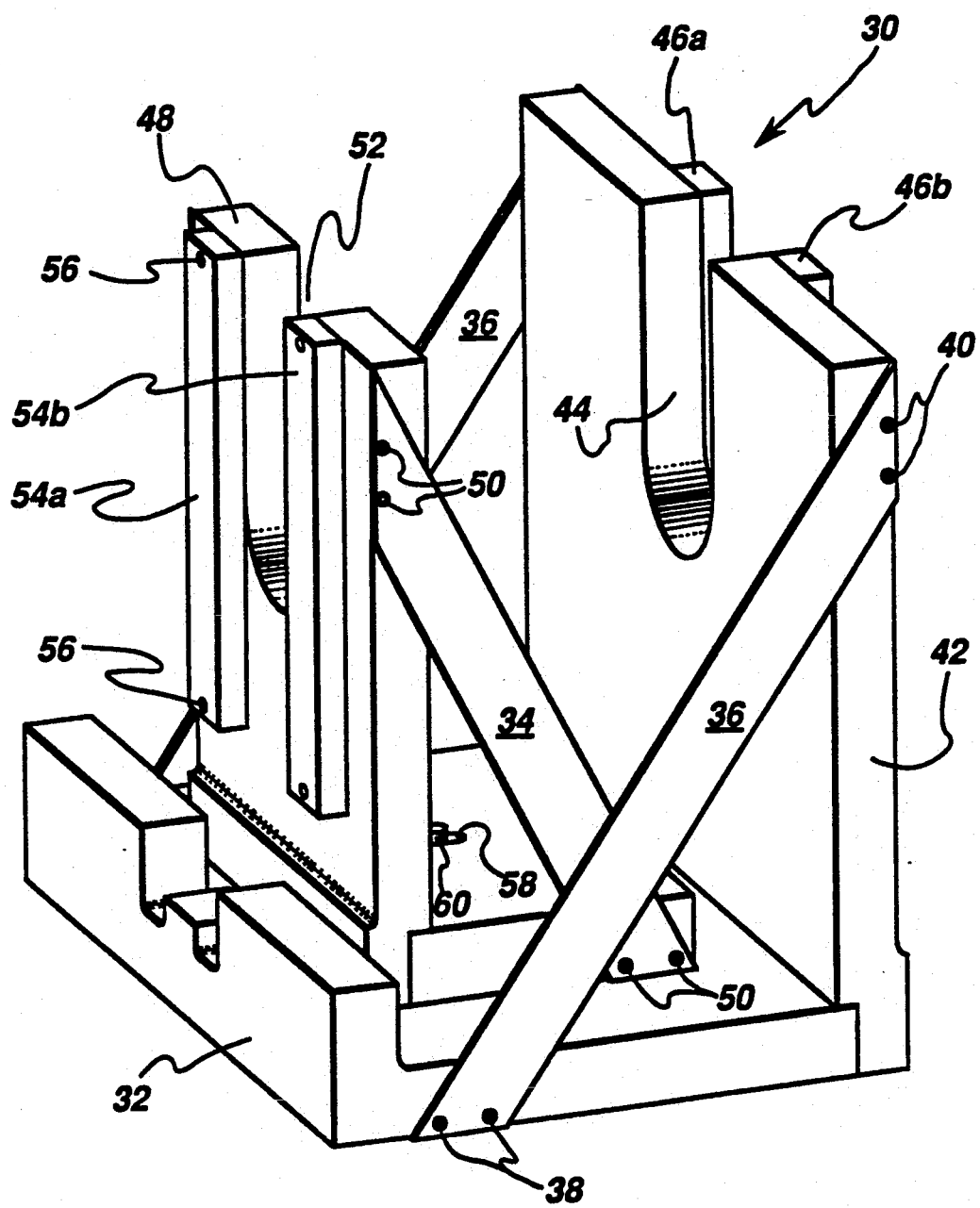
FIG. 2 is a schematic view of an alignment assembly jig, according to the present invention.

With respect to FIG. 2, there is illustrated jig assembly 30 for constructing modular face-pumped slab laser head 2. Jig assembly 30 includes, in part, bottom plate 32, supports 34 and 36, and end plates 42 and 48. Plates 32, 42 and 48 and supports 34 and 36, preferably, are constructed of aluminum. Bottom plate 32 is rigidly attached end plate 42 by conventional fasteners (not shown). Support 34 is rigidly attached to end plate 48 by conventional fasteners 50. Supports 36 are rigidly attached to bottom plate 32 by conventional fasteners 38. Support 36 is also rigidly attached to end plate 42 by conventional fasteners 40.

Located on top of second end plate 42 are alignment blocks 46a and 46b. Blocks 46a and 46b, preferably, are constructed of aluminum and are rigidly attached to end plate 42 by conventional fasteners (not shown). Third slot 44, which is machined in second end plate 42 by conventional machining techniques, is located on the upper half of end plate 42. Block 46a is, preferably, precisely aligned by conventional techniques, pinned by conventional pins (not shown) and fastened to plate 42 by conventional fasteners (not shown). Block 46b is then rigidly attached to plate 42 by conventional fasteners (not shown).

First end plate 48 is rigidly attached to bottom plate 32 by a conventional fastener 60. Fastener 60 is located in first slot 58 in first end plate 48. Slot 58 is machined into end plate 48 by conventional machining techniques. Located on top of end plate 48 are alignment blocks 54a and 54b. Blocks 54a and 54b, preferably, are constructed of aluminum and are rigidly attached to end plate 48 by conventional fasteners 56. Block 54a is, preferably, precisely aligned by conventional techniques, pinned by conventional pins (not shown) and fastened to plate 48 by conventional fasteners (not shown). Block 54b is then rigidly attached to plate 48 by conventional fasteners (not shown). Second slot 52 is machined into the upper half of first end plate 48 by conventional machining techniques.

Figure 3:
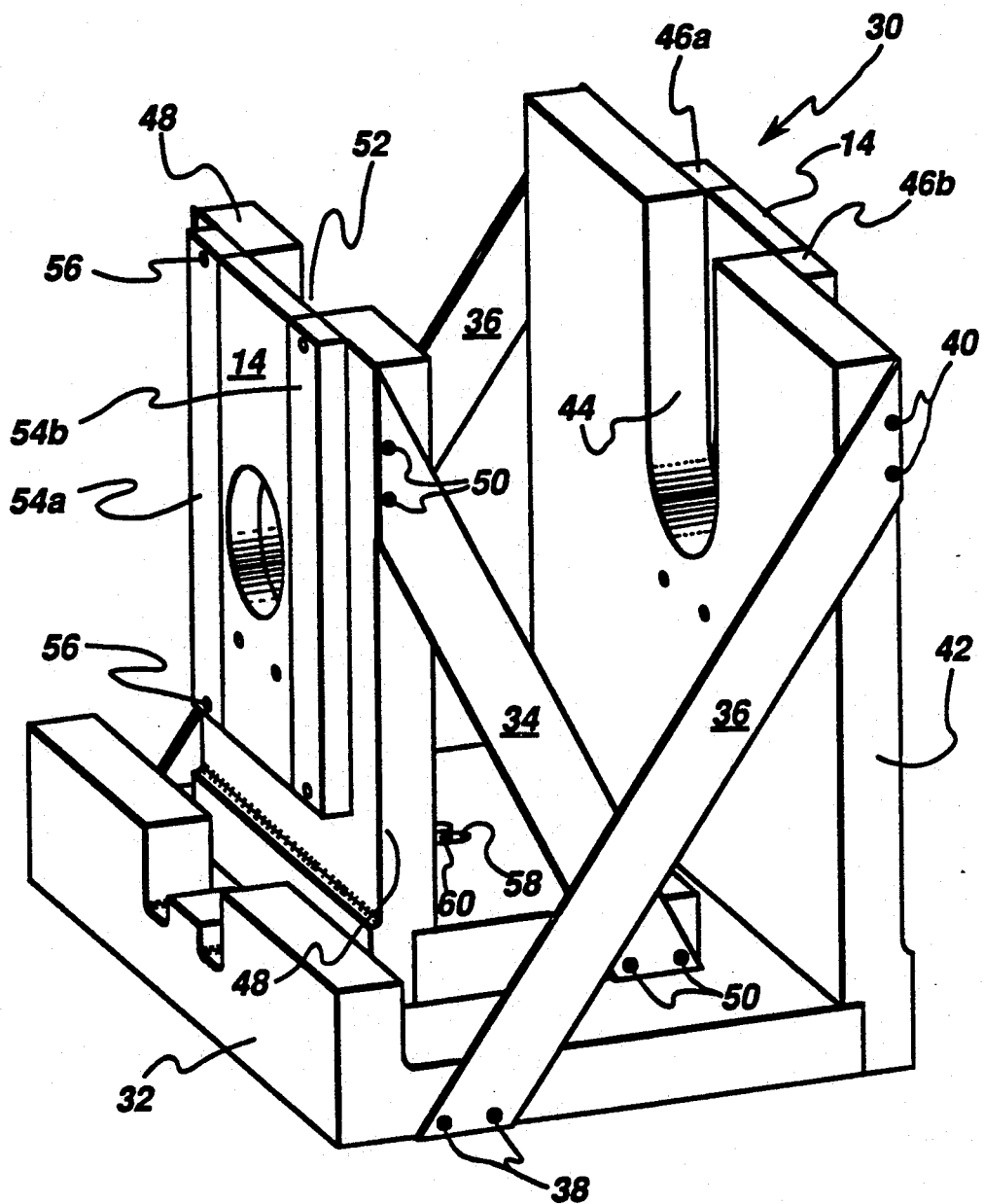
FIG. 3 is a isometric view of the assembly jig with the inner end caps in place.

FIG. 3 shows inner end caps 14 located on jig assembly 30. In particular, inner end caps 14 are located on end plates 42 and 48. Inner end caps 14 are rigidly retained on end plates 42 and 48 by conventional fasteners 61. As can be seen, inner end caps 14 are located on end plate 42 between alignment blocks 46 and on end plate 48 between alignment blocks 54.

Figure 4:
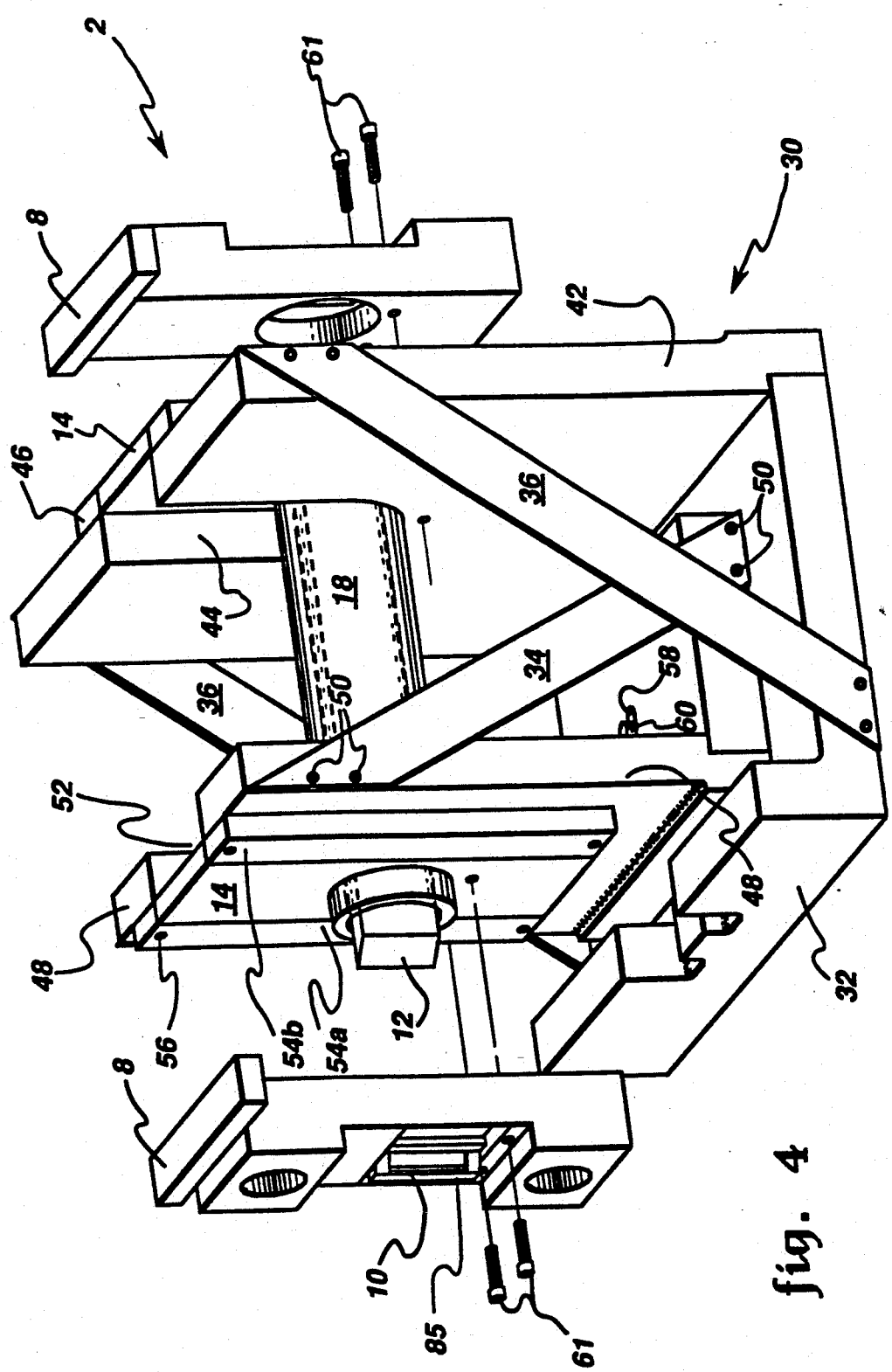
FIG. 4 is an isometric view of the assembly jig with the slab flow tube, gaskets and outer end caps in place.

FIG. 4 shows outer end cap 8 after slab 12 has been place into alignment slot 10. In particular, slab 12 is placed within slab tube 18 (FIG. 1). Gaskets 16 (FIG. 1) are then placed around tube 18. Tube 18 is then placed within jig assembly 30 such that slab 12 fits in alignment holes 10 of outer end caps 8. Outer end caps 8 are then fastened to inner caps 14 by conventional fasteners 62. Retainer 85 and seal 84 are placed around slab 12.

Figure 5:
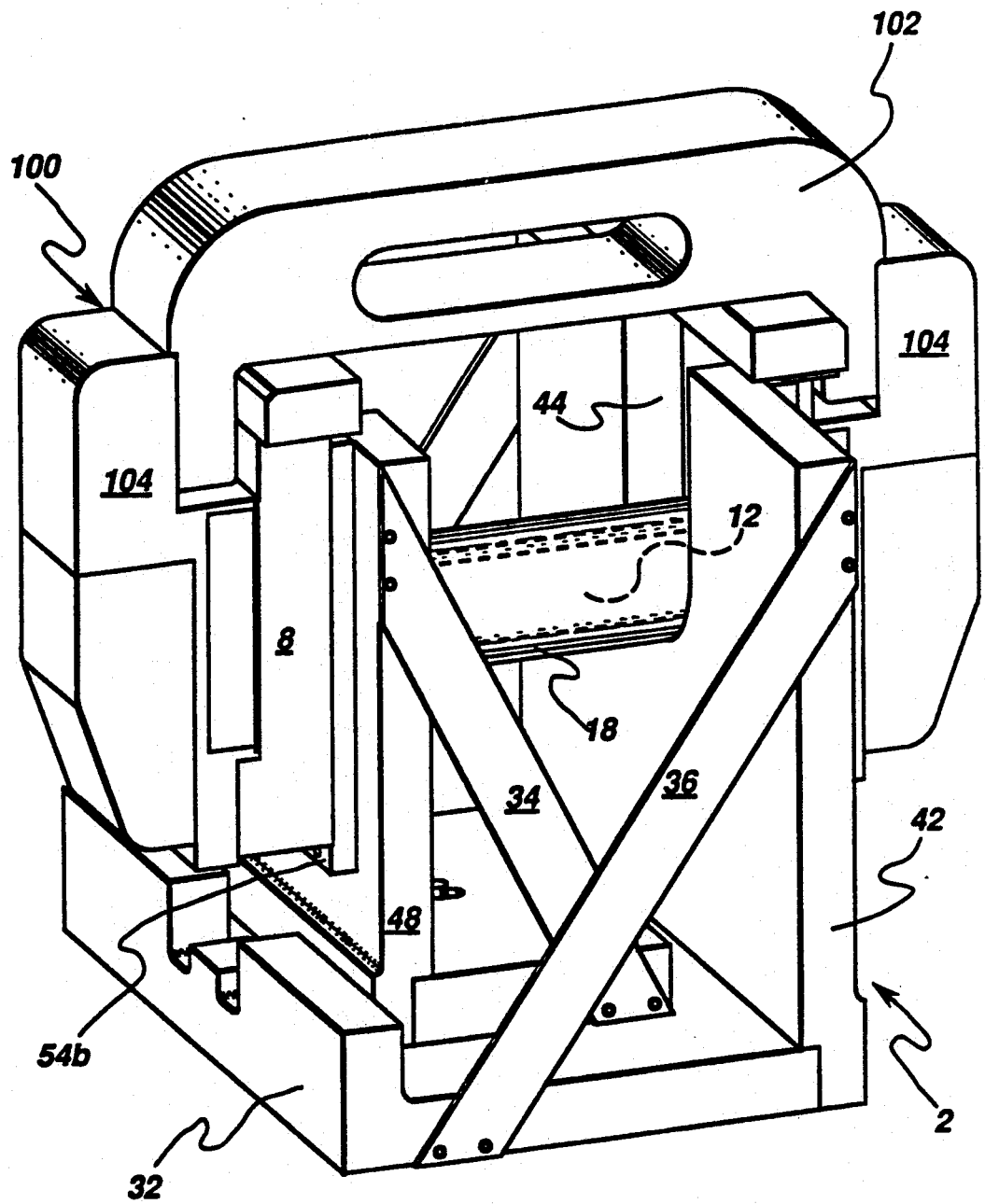
FIG. 5 is an isometric view of an assembled face-pumped laser slab with the end caps the handle and the compression device in place.
Figure 7:
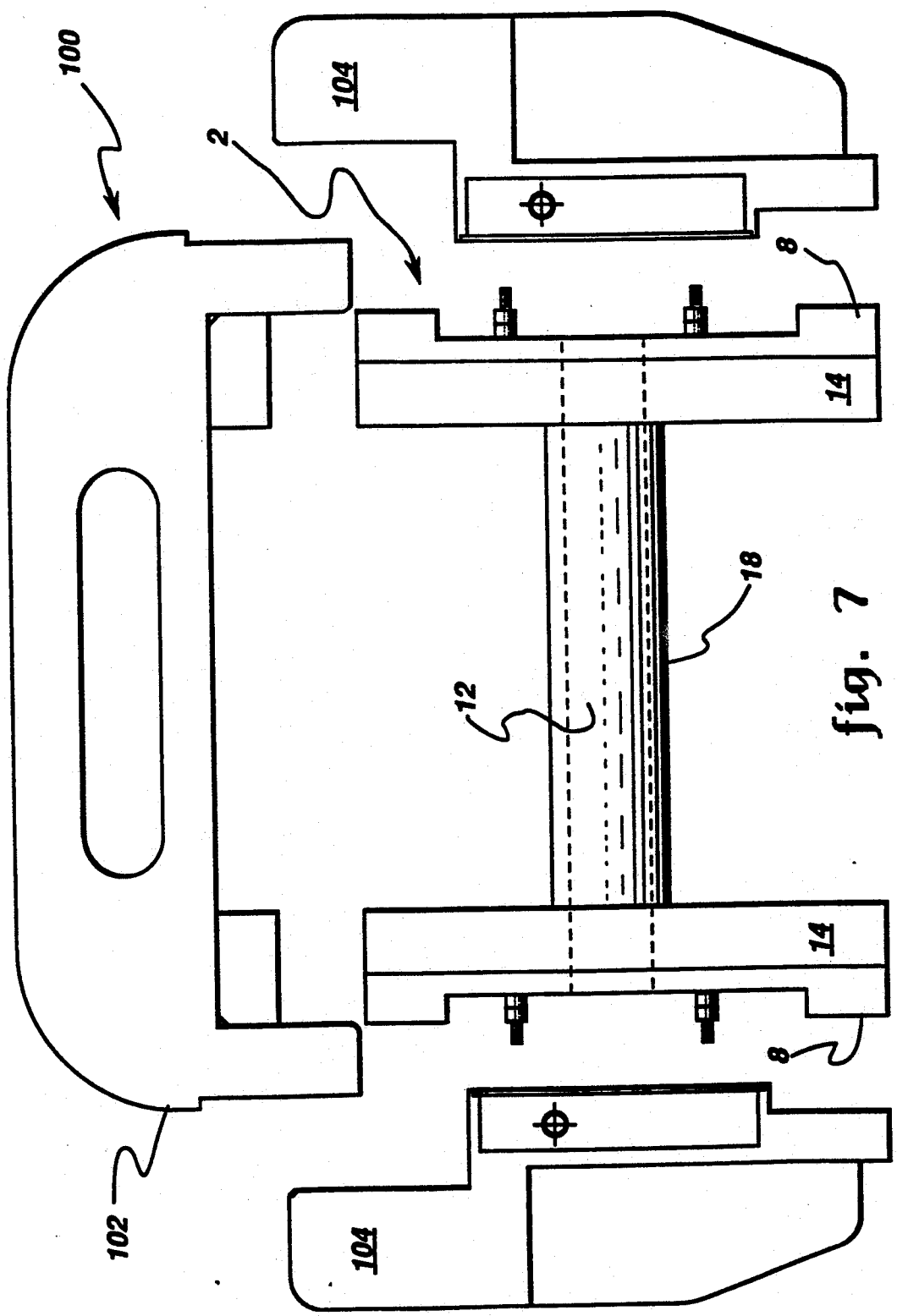
FIG. 7 is an exploded side plan view of the components for a positioning, compression and storage device for a modular face-pumped laser system, according to the present invention.
Figure 8:
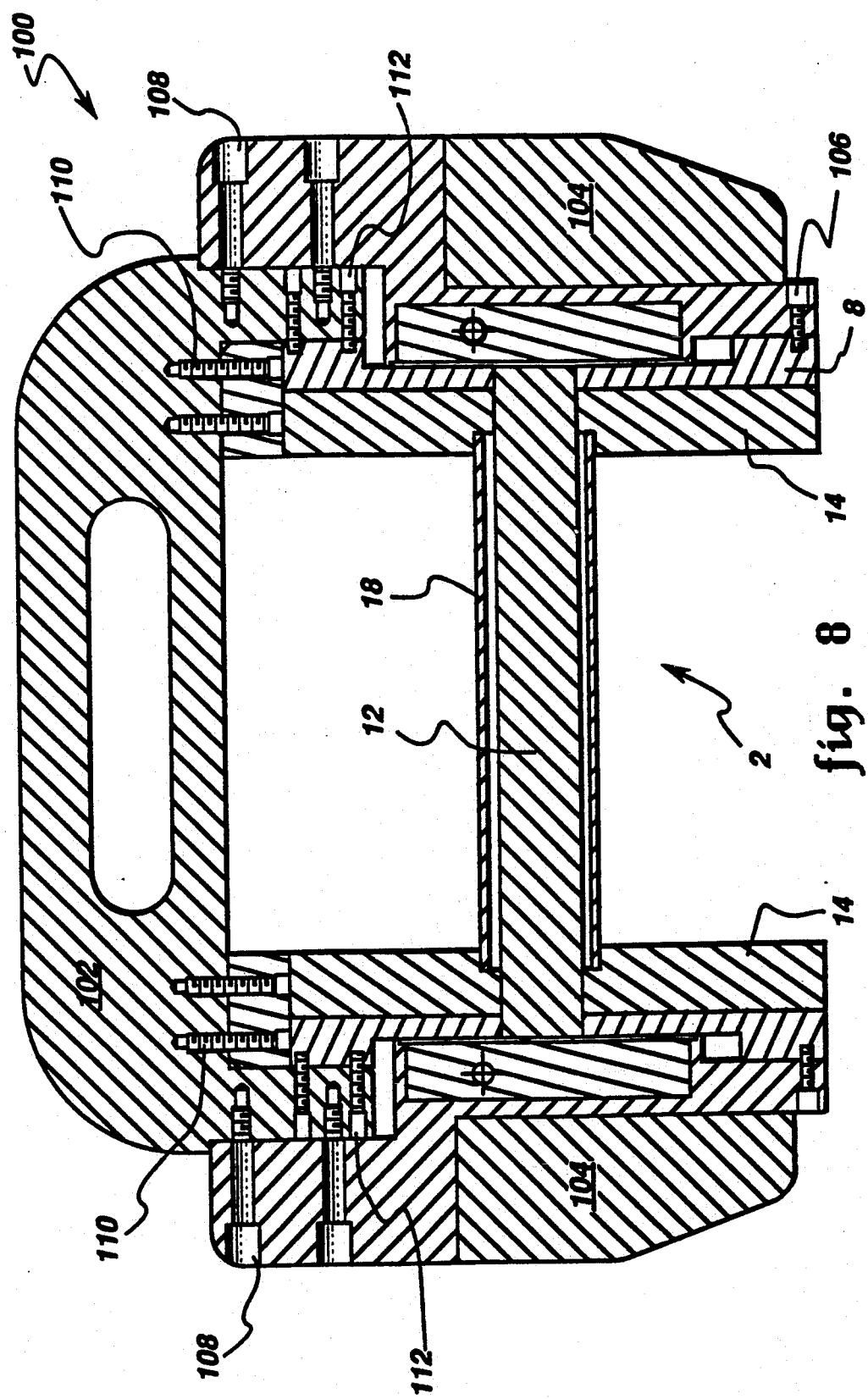
FIG. 8 is a side plan view of an assembled positioning compression and storage device.

With respect to FIG. 5, there is illustrated positioning compression and storage device 100. Device 100 is rigidly secured to outer end caps 8. In particular, as can be more clearly shown in FIGS. 7 and 8, assembly 100 includes, in part, handle 102 and compression flanges 104. Handle 102 and flanges 104, preferably, are constructed of aluminum. As shown more clearly in FIG. 1, handle 102 is placed over head 2 and rigidly attached to outer end cap 8 by conventional fasteners 112. Handle 102 is also rigidly attached to outer end cap 8 and inner end cap 14 by conventional fasteners 110. Compression flanges 104 are rigidly attached to outer end cap 8 by conventional fasteners 106. Also, flanges 104 are rigidly attached to handle 102 by conventional fasteners 108.

Figure 6:
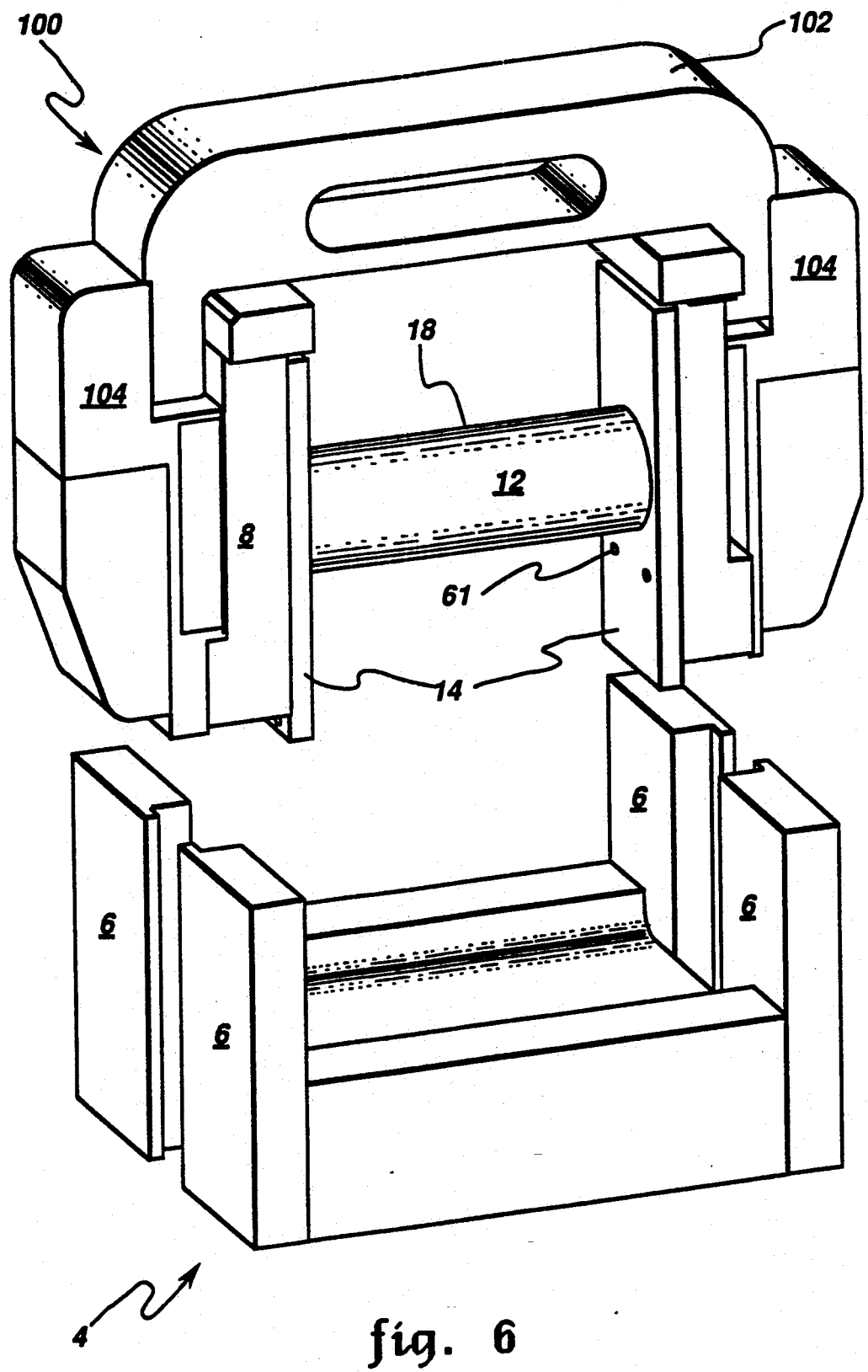
FIG. 6 is an isometric view of the modular slab component prior to insertion into the lower reflector half with the positioning, compression and storage device not attached.

FIG. 6 shows a partially constructed modular face-pumped slab laser head 2. In particular, in this illustration, compression assembly 100 is still attached to outer end caps 8 such that compression assembly 100 can be stored. In this manner, if a defect occurs in slab 12 due to, for example, a contamination or fracture of slab 12, the operator merely has to remove compression assembly 100 from slab laser head 2 and replace the defective compression assembly 100 with a new compression assembly 100. The defective compression assembly 100 can then be repaired. It is to be understood that compression assembly 100 allows outer end caps 8 and 14 to be rigidly held in place while providing proper alignment for slab 12. This allows compression assembly 100 to be placed in a proper storage area so that it can be used later if by chance the compression assembly 100 that is currently being used in laser head 2 fails.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. An alignment jig assembly for a modular face-pumped laser head, wherein said assembly is comprised of:
   a bottom plate means;
   first and second end plate means operatively connected to said bottom plate means such that a distance between said first and second plates is adjustable;
   an alignment means operatively connected to said first and second end plate means wherein said alignment means is further comprised of:
   a block means;
   a first slot means substantially located on said first end plate means; and
   a fastener means operatively connected to said bottom plate means and said first slot means; and
   a support means operatively connected to said bottom plate means and said first and second end plate means.

2. The assembly, as in claim 1, wherein said first end plate means are further comprised of:
   a second slot means.

3. The assembly, as in claim 1, wherein said second end plate means are further comprised of:
   a third slot means.

* * * * *